March 22, 1960   D. H. FENSKE ET AL   2,929,501
CYCLONE SEPARATOR
Filed Jan. 30, 1957   4 Sheets-Sheet 1

Inventors:
Roy T. Sorensen
Douglas H. Fenske
By: Ernest V. Haines
Attorney

Inventors:
Roy T. Sorensen
Douglas H. Fenske
By: Ernest V. Haines
Attorney

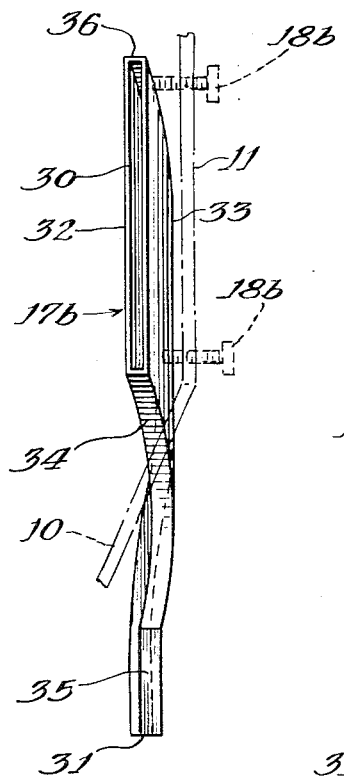
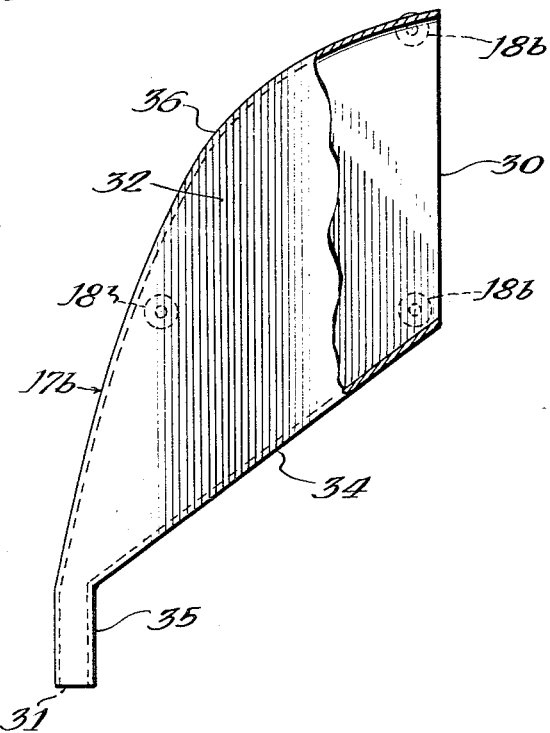
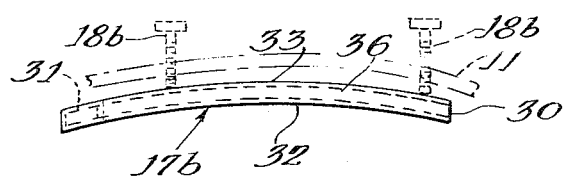

March 22, 1960 D. H. FENSKE ET AL 2,929,501
CYCLONE SEPARATOR
Filed Jan. 30, 1957 4 Sheets-Sheet 4

Inventors:
Roy T. Sorensen
Douglas H. Fenske
By: Ernest V. Haines
Attorney

United States Patent Office 2,929,501
Patented Mar. 22, 1960

2,929,501

CYCLONE SEPARATOR

Douglas H. Fenske, Lakeland, Fla., and Roy T. Sorensen, Carlsbad, N. Mex., assignors to International Minerals & Chemical Corporation, a corporation of New York Application January 30, 1957, Serial No. 637,208

10 Claims. (Cl. 209—144)

This invention relates to a method and means of separating solids suspended in a gaseous medium in a cyclone separator. More particularly, a method and means are provided for separating solids which heretofore could not be readily separated in a cyclone separator because of the similarity of physical characteristics of the solids to be separated. Still more particularly, this invention relates to an improved design of a cyclone separator having a cone frustum-type vortex finder, an auxiliary gas supply means, and a scoop-like solids outlet.

Cyclone separators of various designs have been used extensively in industry for the separation of solids from fluid mediums such as in the separation of solids from exhaust gases and in the concentration of slurries. A mixture of solids having different physical properties may also be separated into two components, when suspended in a gaseous or liquid medium, in a cyclone separator.

When solids are suspended in a gaseous medium and fed at a high velocity into a cyclone separator, the solids are subjected to centrifugal forces which greatly exceed the gravitational force upon the solids. Solids which are more affected by centrifugal force are packed against the wall of the cyclone, causing frictional forces to be created between these solids and the wall. As these solids become more affected by frictional forces, the velocity of the solids decreases, and the solids descend in a helical path to the apex of the cyclone where they are recovered. Solids which are least affected by centrifugal force are also least affected by frictional forces, and ascend to the top of the cone via the vortex and pass out through the vortex finder.

In general, solids having a relatively large mesh size or high specific gravity will be more affected by centrifugal force in a cyclone separator, and because of the frictional forces created between the solids and the wall of the cyclone, these solids will descend to the apex of the cyclone. Solids having a relatively small mesh size or low specific gravity are least affected by the centrifugal and frictional forces and will ascend to the top of the cyclone. Similarly, solids having a relatively large surface area per unit of mass, for example, discs, plates, fibers, cylinders, prisms, and the like, will be more affected by frictional forces and descend to the apex. Solids having a relatively small surface area per unit of mass, for example, spheres, cubes, prisms, ellipsoids, and the like, are least affected by frictional forces and will ascend to the top of the cyclone.

A cyclone separator can be used to obtain substantially complete separation of solids having a relatively large mesh size, high specific gravity and large surface area per unit of mass (each of these physical characteristics favoring the passing of these solids to the apex of the cone) from solids having a relatively small mesh size, low specific gravity, and small surface area per unit of mass (each of these physical characteristics favoring the passing of these solids to the top of the cyclone). However, as the degree of difference in physical characteristics of the solids to be separated decreases, the degree of separation decreases. For example, if there is a relatively large difference in mesh size and specific gravity of the solids to be separated and like shape characteristics, the degree of separation will be less than that obtained when all three physical characteristics differ. Similarly, when the solids differ in but one physical characteristic, the degree of separation possible will be less than that obtainable when the solids differ in two or more physical characteristics. For example, a mixture of solids having similar mesh sizes and similar specific gravities, but dissimilar shape characteristics are not readily separated in a cyclone separator of conventional design, i.e., a cyclone comprised of a conical section secured at its base to a cylindrical section having a feed inlet tangential to the cylindrical section, a solids outlet at the apex of the cone, and a solids outlet in the center of the top cover of the cylindrical section. When a mixture of solids of this type is fed to a cyclone separator of conventional design, solids having the largest surface area per unit of mass will descend to the apex while solids having the smallest surface area per unit of mass will pass out the top of the cyclone. Those solids which have a surface area intermediate the surface area of the solids passing out the top and those passing out the apex travel in a circular path in the cylindrical section of the cyclone. Solids of intermediate surface area gradually build up in the cylindrical section and are forced to the apex of the cone instead of passing out the top of the cyclone. Little or no separation of the solids mixture of this type is obtained.

It is an object of this invention to provide a method and means of separating solids which are affected by centrifugal and frictional forces to a different degree when traveling in a helical path and when suspended in a gaseous medium.

It is another object of this invention to provide an improved method and improved means of separating, in a gaseous medium, solids which differ in physical characteristics.

Other objects and advantages of this invention will appear from the following detailed description thereof.

It has been discovered that a cyclone separator having an auxiliary gas supply, a cone frustum vortex finder, and an adjustable scoop may be used to separate solids from a mixture which heretofore could not be readily separated in a cyclone separator.

A mixture of solids which are effected by centrifugal and frictional forces to a different degree when traveling in a helical path may be separated in a continuous process by suspending the feed in a gaseous medium and introducing the feed suspension under pressure into a confined circular space, such as a cyclone separator. The feed suspension is introduced tangentially into the circular space at a point intermediate the top and bottom of the circular space, wherein centrifugal and frictional forces are imparted to the solids. Solids in the portion of the circular space above the feed inlet are caused to move in an acceleration zone which is separated from an outlet zone by an impermeable barrier. The outlet zone and acceleration zone are complementary zones forming the circular space above the feed inlet. The outlet zone is adjacent to the central axis of the circular space, and has a cross-sectional area in the form of a circle, said cross-sectional area increasing gradually and continuously from the top of the circular space towards a plane perpendicular to the central axis of the circular space through the point of introducing the feed suspension. The acceleration zone is between the impermeable barrier and the periphery of the circular space. A cross-sectional area of the acceleration zone is in the form of an annular ring, said cross-sectional area decreasing gradually and continuously from the top of the circular space towards a plane perpendicular to the central axis of the circular space through the point of introducing the feed suspension. An auxiliary gaseous medium is introduced tangentially into the acceleration zone at a point intermediate the top of the circular space and the point of introducing the feed suspension. Auxiliary gas is introduced at a velocity in excess of the entrance velocity of the feed suspension, and flows in the same direction as the flow of the suspension within the circular space. A portion of the gaseous medium is discharged at an axial point at the top of the outlet zone. A major portion of solids most affected by centrifugal and frictional forces are discharged at an axial point at the bottom of the circular space. Solids least affected by centrifugal and frictional forces are suspended in a portion of the gaseous medium and discharged at a point at the top of the confined circular space. Solids intermediately affected by these forces are discharged at a point intermediate the point of introducing the feed suspension and top of the confined circular space. Said point of discharge of solids intermediately affected by centrifugal and frictional forces is near but removed from the periphery of the circular space.

More in detail, solids which are affected by centrifugal and frictional forces to a different degree when traveling in a helical path while suspended in a gaseous medium may be separated by the method and means of the instant invention. Mixtures of solids such as mica mixed with sand and organic matter, mica mixed with feldspar, slate mixed with coal, galena mixed with quartz, iron mixed with sand, and the like, are contemplated as feed materials in the instant invention.

The mixture is suspended in a gaseous medium, for example, air, and introduced tangentially into a cyclone separator having an inverted conical section secured at its base to a cylindrical section as described more fully below.

Entrance velocity of the feed suspension should be sufficient to impart centrifugal forces to the solids which greatly exceed the gravitational forces affecting the solids. A major portion of solids most affected by centrifugal and frictional forces, because of large mesh size, high specific gravity, and large surface area per unit of mass, will descend in a cyclonic vortex to the apex of the cyclone where they are discharged. Solids intermediately affected by centrifugal and frictional forces will ascend above the feed inlet and travel in a circular path in the acceleration zone.

An auxiliary gas such as air is introduced under pressure at a point intermediate the feed inlet and the top of the cyclone, tangentially to the periphery of the cyclone, and in a direction concurrent to the direction of the feed suspension. Auxiliary gas is introduced at a velocity in excess of the entrance velocity of the feed suspension. Addition of the auxiliary gas in this manner increases the velocity of the solids traveling in a circular path in the space above the feed inlet in the vicinity of the cyclone wall. When an impermeable barrier in the form of a cone frustum is placed in the top of the cylindrical section of the cyclone above the feed inlet, additional velocity is imparted to the solids traveling in the acceleration zone, i.e., the space above the feed inlet between the wall of the cyclone and the cone frustum. The increased velocity of the solids resulting from the effect of the auxiliary gas and the cone frustum subjects the solids to increased centrifugal forces. As a result the solids above the feed inlet in the vicinity of the cyclone wall which are most affected by centrifugal force will be forced against the cyclone wall, frictional forces will be created between these solids and the cyclone wall, the velocity of the solids will decrease and they will descend to the apex of the cyclone where they are discharged.

Those solids least affected by centrifugal force, such as fine solids present in the feed and those created by attrition while passing through the cyclone separator, are discharged with a portion of the gaseous medium through the opening in the center of the top cover of the cyclone.

Those solids affected by centrifugal and frictional forces to a greater extent than the fine solids passing out the top of the cyclone and to a lesser extent than those solids passing to the apex of the cyclone are defined in the description and claims as "solids intermediately affected by centrifugal and frictional forces." The solids intermediately affected by centriful and frictional forces will stratify in the space at the lower portion of the cylindrical section and at the upper portion of the cone section in the area in the vicinity of the cyclone wall. These solids stratify in an annular layer which is substantially parallel to the axis of the cyclone. The upper portion of the layer is in the lower portion of the cylindrical section, and has a cylindrical-like shape. The lower portion of the layer which extends into the cone section of the cyclone is in the form of an inverted truncated cone. In some instances the layer may form entirely within the cylindrical section and does not extend into the conical section of the cyclone. The width of the stratified layer of solids intermediately affected by centrifugal and frictional forces varies with the materials being separated and the operating conditions of the cyclone, but is on the order of between about ⅜" and about 1" wide. The distance between the outer surface of the solids layer and the inner surface of the cyclone wall is between about ¼ and about 1".

Solids in the stratified layer may be removed by inserting a scoop-like conduit through the wall of the cyclone to tangentially intersect the layer of solids. Dimensions of the end of the scoop in the cyclone may be equal to or less than the dimensions of a longitudinal cross section of the stratified layer of solids. The solids in the stratified layer which are intercepted by the scoop are conveyed to the outside of the cyclone where they are collected.

If desired, a vacuum may be applied to the exit end of the scoop to further increase the velocity of the solids in the upper portion of the cyclone.

This invention resides in the steps of the method and certain embodiments of the apparatus illustrated in the accompanying drawings in which.

Figure 3:
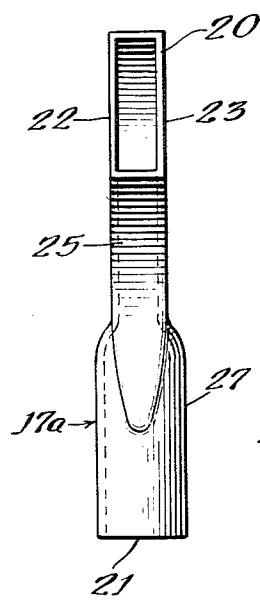
Figure 4:
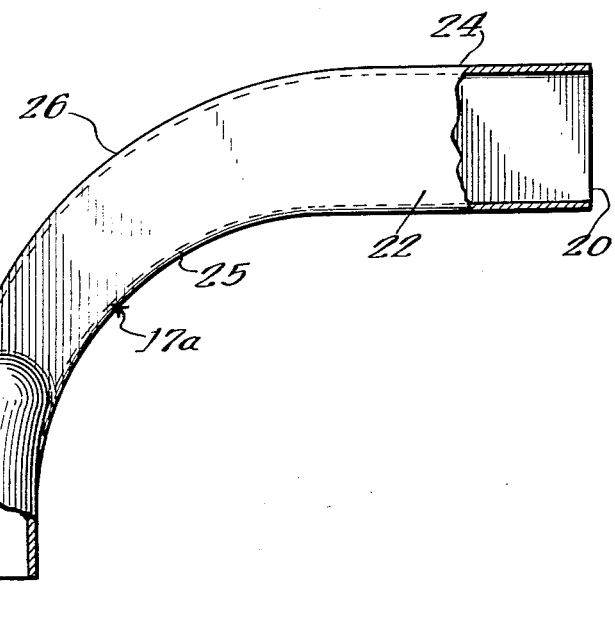
Figure 5:
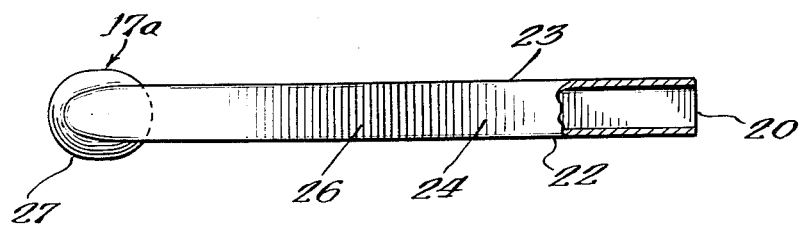

Figures 3, 4, and 5 show the front elevational, the side elevational, and the plan view, respectively, of a stationary type scoop-like solids outlet.

Figures 6, 7, and 8 show the front elevational, the side elevational, and the plan view, respectively, of one type of adjustable scoop-like solids outlet.

Figure 9:
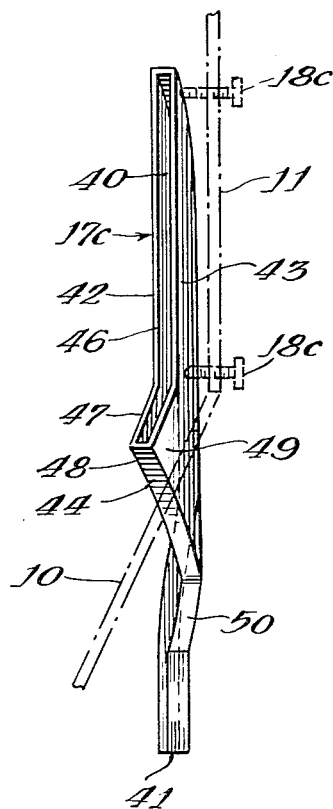
Figure 10:
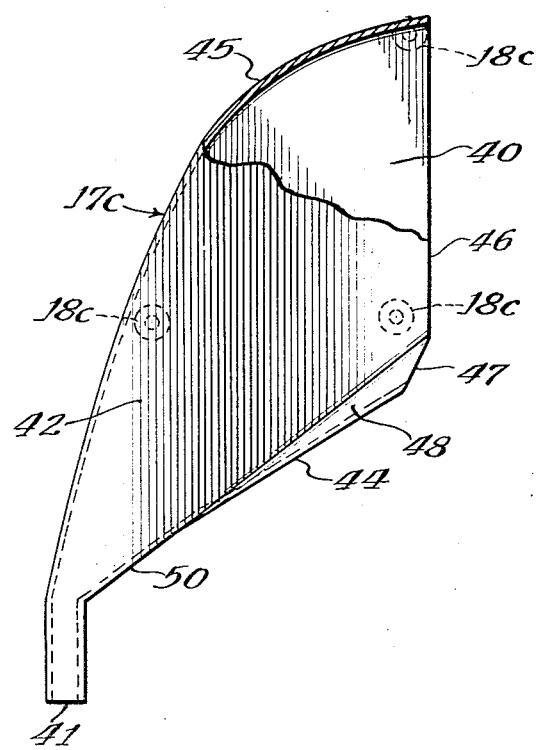
Figure 11:
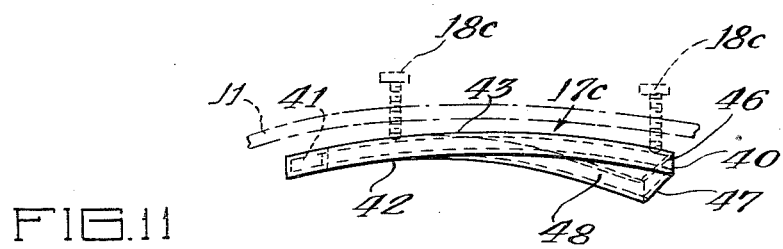

Figures 9, 10, and 11 show the front elevational, the side elevational, and the plan view, respectively, of another type of adjustable scoop-like solids outlet.

Figure 1:
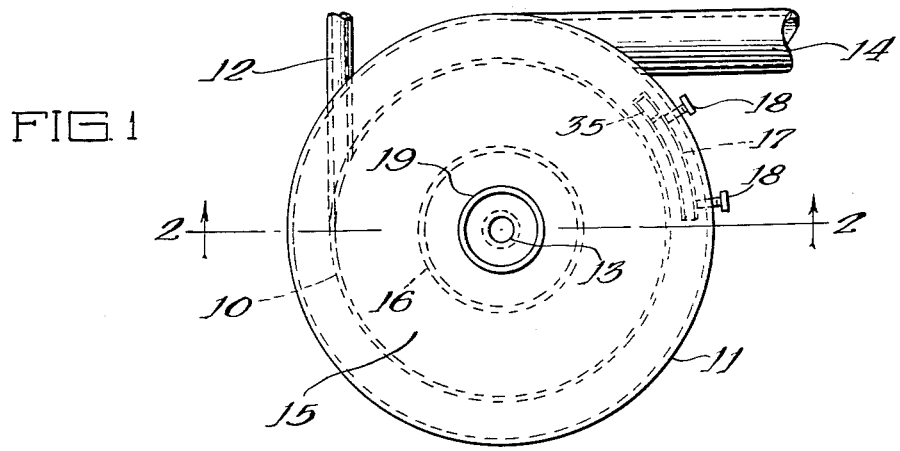
Figure 1 is a plan view of the cyclone separator.
Figure 2:
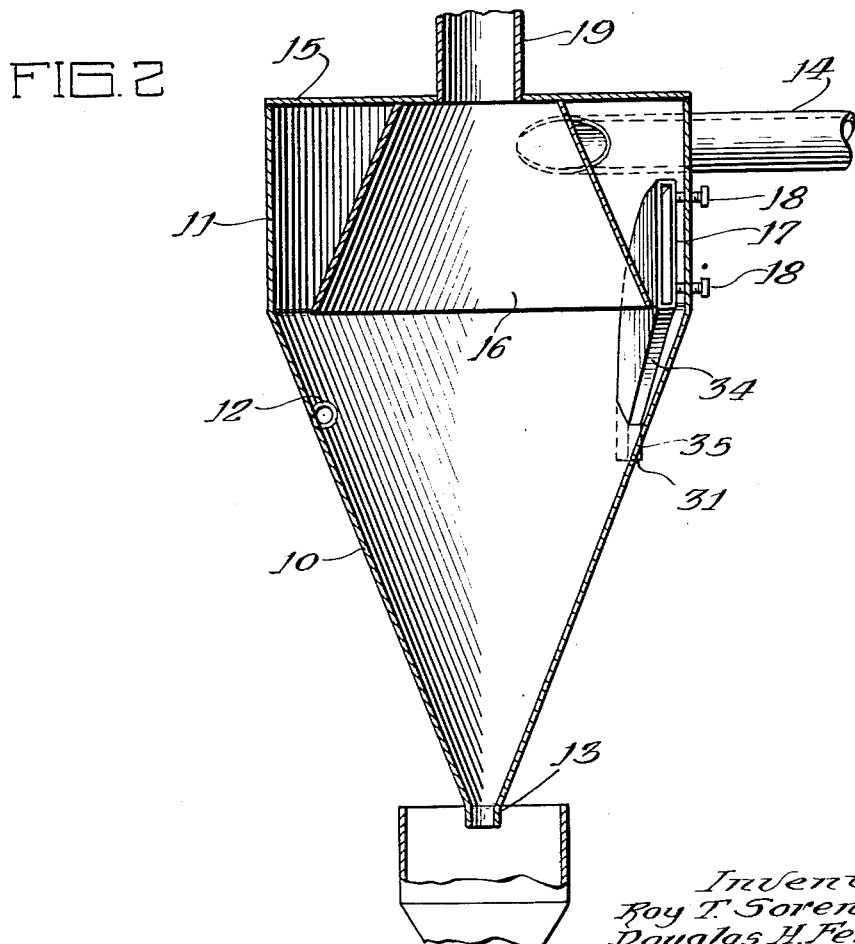
Figure 2 is a sectional elevational view of the cyclone separator through lines 2—2 of Figure 1.

Figures 1 and 2 show a cyclone separator of suitable material of construction, such as steel plate, having an inverted cone 10 secured as by welding at its base to a cylindrical section 11. The ratio of the length of the cone 10 to the length of the cylinder 11, as measured along the central axis, may be between about 3:1 and about 1:1, but preferably about 3:2. The total length of the cyclone, as measured along the central axis is on the order of about 4 feet, but may be between about 3 to 6 feet.

Cone 10 may form an angle with the central axis between about 12° and about 40°, but is preferably about 30°. The inside diameters of the base of the cone 10 and cylindrical section 11 are identical. The diameter of cylindrical section 11 may be varied, depending upon the material to be separated, the rate of feed and the like, but preferably the diameter is between about 2 and about 3 feet.

Cone 10 is intersected tangentially by the feed inlet 12 in order that the solid particles will have a smooth entry into the cyclone and travel around the periphery of the cyclone with a minimum of disturbance. Feed inlet 12 may be a tubular member having an inside diameter of between about ¾" and about 1½", and preferably about 1". A rectangular member, having a cross sectional area equivalent to the above described tubular member may also be used. The feed inlet 12 is positioned in the upper one-third of the cone. The central axis of feed inlet 12 lies in a plane which is substantially perpendicular to the central axis of the cyclone.

An aspirator-like means (not shown) may be used to feed the solids under pressure through feed inlet 12 into the cyclone. One end of the feed inlet 12 is secured to a suitable compressor (not shown) which forces a gaseous medium such as air through the feed inlet 12. Solids are fed by gravity into an opening in the top of the feed inlet 12. Passage of the gaseous medium past the opening in the top of the feed inlet 12 carries solids being introduced to the feed line to the cyclone where they are introduced at a high velocity into cone 10. Solids are introduced into the cyclone at a velocity sufficient to exert a centrifugal force upon the solids that greatly exceeds the effect of gravitational forces upon the solids.

Solids which are most affected by centrifugal and frictional forces descend in a cyclonic vortex or helical path to the apex of cone 10 where they are discharged through solids outlet 13, and collected in a suitable container. Solids which are intermediately affected by centrifugal and frictional forces ascend above the feed inlet 12 and move in a circular path in the vicinity of the periphery of the cyclone, in the upper portion of cone 10 and the lower portion of cylindrical section 11.

Cylindrical section 11 is intersected tangentially by an auxiliary gas inlet 14. Auxiliary gas inlet 14 may be a tubular member having an inside diameter between about 5" and about 7" and preferably about 6". A rectangular member, having a cross sectional area equivalent to the above described tubular member may also be used. Auxiliary gas inlet 14 may be positioned at any point between the feed inlet 12 and the top of the cyclone, but is preferably positioned in the upper one-half of the cylindrical section 11. The central axis of the auxiliary gas inlet 14 preferably lies in a plane which is substantially perpendicular to the central axis of the cyclone. The gas from the auxiliary gas inlet 14 is introduced in a direction concurrent to the direction of flow of the solids entering through feed inlet 12. The entrance velocity of the auxiliary gas should be between about 1500 and about 4000 feet per minute, and preferably between about 2000 and about 3700 feet per minute. The velocity of the auxiliary gas exceeds the velocity of the gas conveying the feed suspension through feed inlet 12. The increased velocity imparted to the solids by the auxiliary gas increases the centrifugal force affecting the solids in the zone above feed inlet 12, adjacent to the cyclone wall.

The top of cylindrical section 11 is secured as by welding to the top cover plate 15. Top cover plate 15 is a metal disc enclosing the top of cylindrical section 11 and positioned perpendicular to the central axis of the cyclone. In the center of the top cover plate 15 is a gas outlet means 19.

Depending from the interior surface of the top cover plate 15 is cone frustum vortex finder 16. The radius of the top of cone frustum vortex finder 16 is preferably between about ¼ and about ⅝ of the radius of cylindrical section 11. The radius of the bottom of the cone frustum vortex finder 16 is preferably about 1.4 times the radius of the top of the cone frustum vortex finder 16. Cone frustum vortex finder 16 serves as a means of conveying gaseous medium from the cyclone separator to the gas outlet means 19. The radius of the gas outlet means 19 is between about 0.4 and 0.6 and preferably about 0.45 times the radius of the top of the cone frustum vortex finder 16. Fine solids which are present in the feed or which are created by attrition pass out in the gaseous medium through gas outlet means 19.

The cone frustum vortex finder 16 also serves to increase the velocity of the solids traveling in a circular path between the cone frustum vortex finder and the cyclone wall. The increased velocity imparted to the solids by the auxiliary gas supply 14 in the presence of the cone frustum vortex finder 16 increases the effect of centrifugal force upon the solids. Solids in the space above the feed inlet 12 which are most affected by centrifugal force are forced against the cyclone wall where frictional forces reduce the velocity of the solids and they descend in a helical path to the apex of cone 10 where they are discharged through solids outlet 13. Solids in the space above the feed inlet 12 which are intermediately affected by centrifugal force tend to stratify in an annular layer near but removed from the periphery of cylindrical section 11. Under certain operating conditions the stratified layer may extend into the upper portion of cone 10.

A scoop-like solids outlet 17 is inserted into the cyclone near but removed from the periphery to intersect the stratified layer of solids and convey them to the exterior of the cyclone. The design of the scoop 17 may be varied as shown in Figures 3 to 11 and as described more fully below. Scoop 17 intersects the cyclone wall either at the lower portion of cylindrical section 11 or at the upper portion of cone section 10, the point of intersection depending upon the design of the scoop 17. Scoop 17 is positioned so that the end in the cyclone will tangentially intersect the stratified layer of solids intermediately affected by centrifugal force which develops in the space between the periphery of the cylindrical section 11 and the cone frustum vortex finder 16. The width, height, and lateral position of the stratified layer varies with the type of feed, the rate of feed, and the velocity of the solids in the cyclone. Scoop 17 is designed so that its height and width are equal to or less than the height and width of the stratified layer of solids. Scoop 17 may be equipped with set screws 18 which may be used to adjust the lateral position of scoop 17 in the event the position of the stratified layer should change during operations. Scoop 17 conveys solids from the stratified layer to the exterior of the cyclone where they are collected in a suitable container.

Three types of scoops are shown in Figures 3 to 11.

Figures 3, 4 and 5 show the front elevational, side elevational and plan view respectively, of a stationary type of scoop 17a. Scoop 17a is a conduit of any suitable design, having feed end 20 in the interior of the cyclone and discharge end 21 at the exterior of the cyclone. Scoop 17a is comprised of a four sided conduit 26 secured as by welding to a tubular section 27. Sides 22 and 23 of section 26 are substantially parallel to each other and preferably parallel to the wall of the cylindrical section 11. Sides 24 and 25 of section 26 are curved and tapered from feed end 20 to the intersection of tubular section 27. Feed end 20, formed by sides 22, 23, 24 and 25 of section 26, is a parallelogram having a height between about ⅕ and about ⅘ the height of the cylindrical section 11. The width of feed end 20 is preferably equivalent to the width of the stratified layer of solids to be separated, which is on the order of between about ⅜" and about 1". Sides 22, 23, 24, and 25 of section 26 are curved and tapered to intersect tubular section 27. The diameter of tubular section 27 is preferably between about ½ and about 2 inches but may be larger if desired.

Scoop 17a is positioned in the cyclone so that feed end 20 is in the space near but removed from the wall of cylindrical section 11. The side of scoop 17a nearest to the cyclone wall (side 22 if the feed is introduced to the cyclone in a clockwise direction, or side 23 if the feed is introduced in a counterclockwise direction) is positioned between about ¼ and about 1" from cylindrical section 11. Scoop 17a intersects the cyclone in the upper portion of cone 10 where it is secured by welding or a calking compound.

Figures 6, 7 and 8 show the front elevational, side elevational and plan view respectively, of one type of adjustable scoop 17b. Scoop 17b is a conduit of any suitable design having feed end 30 in the interior of the cyclone and discharge end 31 at the exterior of the cyclone. Feed end 30 is in the form of a regular parallelogram formed by sides 32, 33, 34 and 36. The parallelogram preferably lies in a plane parallel to the central axis of the cyclone, but the position may be varied if desired. The height of feed end 30 is between about ⅕ and about ⅘ the height of cylindrical section 11. The width of feed end 30 is between about ⅜ and about 1". The bottom edge of feed end 30 preferably lies in a plane which is perpendicular to the central axis of the cyclone and which intersects the juncture of cylindrical section 11 with cone section 10. Sides 32 and 33 are substantially parallel to cylindrical section 11 and each side has a curvature with a radius equivalent to or slightly less than the radius of cylindrical section 11. Sides 32 and 33 are curved to conform with the curvature of cylindrical section 11 in order that the solids outside the layer of solids to be separated will not be disturbed excessively. Side 34 which is secured to the lower edges of sides 32 and 33 is a curved plate which tapers from feed end 30 to vertical side 35. Side 36, located at the top edges of sides 32 and 33 is a curved plate extending from feed end 30 to discharge end 31. Discharge end 31 is a regular parallelogram formed by sides 32, 33, 35 and 36.

Scoop 17b is inserted into a suitable opening in the upper portion of cone section 10. A calking compound is used to seal the openings at this intersection. Threaded openings in the walls of cylindrical section 11 are used to hold set screws 18b. The ends of the set screws are placed in suitable indentations in the side of scoop 17 nearest the cyclone wall. The set screws may be used to vary the lateral position of scoop 17b. The scoop is positioned so that feed end 30 tangentially intersects the stratified layers of solids, and is used to convey the solids to the exterior of the cyclone. The distance from the side of scoop 17b nearest the cyclone wall (depending upon the direction of feed) to the cyclone wall may be varied between about ¼ and about 1".

The scoop described in Figures 6, 7 and 8 gives best results when the stratified layer forms in the cylindrical section 11 and does not extend into the upper portion of cone section 10.

Figures 9, 10 and 11 show the front elevational, the side elevational view and the plan view respectively of another type of adjustable scoop 17c. Scoop 17c may be used in cases where the stratified layer extends into the upper portion of cone section 10. Scoop 17c is a conduit of suitable material of construction having feed end 40 in the interior of the cyclone and the discharge end 41 at the exterior of the cyclone. Scoop 17c is positioned in the area adjacent to the periphery of cylindrical section 11.

Feed end 40 is formed by upper section 46 and lower section 47. Upper section 46 is in the form of a vertical rectangle having its lower edge preferably lying in a plane which is perpendicular to the central axis of the cyclone and which intersects the juncture of cylindrical section 11 and cone section 10. Upper section 46 of feed end 40 is formed by sides 42, 43 and 45 of scoop 17c and the line of intersection with the upper edge of lower section 47. Sides 42 and 43 are substantially parallel to each other and are preferably parallel to cylindrical section 11, but their lateral position may be varied if desired. Sides 42 and 43 are curved, the curvature of each side having a radius substantially equal to or slightly less than the radius of cylindrical section 11. Sides 42 and 43 are spaced between about ⅜ and about 1" apart, the side nearest to the cyclone wall being positioned between about ¼ and about 1" from the cyclone wall. The height of section 46 is between about ⅕ and about ⅘ the height of cylindrical section 11.

Side 45 is a curved plate secured to the upper edges of sides 42 and 43, extending from feed end 40 to discharge end 41.

Lower section 47 of feed end 40 is a parallelogram formed by sides 44, 48, 49 and the intersection of the section 47 with section 46. The parallelogram lies in a plane which slopes from section 46 towards discharge end 41. Edges of the parallelogram formed by sides 48 and 49 are substantially parallel to the slope of cone section 10. Sides 48 and 49 are substantially parallel to each other and taper from section 47 to intersect sides 42 and 43 respectively, at a point preferably more than about ⅔ of the distance from section 47 to discharge end 41. The lower edges of sides 48 and 49 are joined by the rectangular plate forming side 44. The portions of the lower edges of sides 42 and 43 not secured to sides 48 and 49 respectively, are secured to the rectangular plate 50.

The upper and lower edges of sides 42 and 43 taper from feed end 40 to discharge end 41 and intersect the cyclone wall in the upper portion of cone section 10. A calking compound is used to prevent air leaks at this intersection.

Threaded circular openings in the walls of cylindrical section 11 are used to hold the set screws 18c. The ends of set screws 18c are seated in indentations in the vertical wall of scoop 17c nearest to the cyclone wall. The lateral position of the scoop 17c may be adjusted with set screws 18c.

The scoop shown in Figures 9, 10, and 11 gives best results when the stratified layer of solids to be separated forms in the lower portion of cylindrical section 11 and the upper portion of cone section 10.

Any number of set-screws may be used with scoops 17b and 17c, but 3 set screws suitably spaced as shown in the figures is generally sufficient. Other means of adjusting the lateral position of the scoops may be used, for example, rods welded to the side of the scoop may be passed through the cyclone wall in place of set screws. In another modification, of the design of scoops 17b and 17c, the position of the scoops is made permanent by welding the scoop to cone section 10 at the point of intersection.

The utility of the invention is illustrated by the following examples which are given by way of illustration and without any intention that the invention be limited thereto.

EXAMPLE I

A mica concentrate was obtained from an underwater silt deposit by screening the silt deposit on a screen of about 4 mesh and a screen of about 35 mesh. The −4+35 mesh fraction had the following analysis:

| Constituent: | Percent by weight |
|---|---|
| Micas [1] | 92 |
| Quartz and feldspar | 4 |
| Organic | 4 |

[1] This mica is predominantly muscovite with some biotite present.

After drying, the solids were suspended in air and fed under pressure into a cyclone separator equipped with an auxiliary gas supply means, a cone frustum vortex finder and a scoop-type solids outlet. The cyclone was fabricated from steel plate and pipe. The cyclone had an overall height of about 45½". The height of the inverted cone section was about 27½" and the height of the cylindrical section was about 18". The opening in the apex of the cone section was about 3" in diameter.

The diameter of the base of the cone section and the diameter of the cylindrical section were about 31". The cone frustum vortex finder attached to the top cover plate of the cyclone had a vertical height of about 18". The diameter of the top of the cone frustum was about 18" and the diameter of the base of the cone frustum was about 25". The exit gas outlet in the form of an 8" diameter pipe was secured by welding at the center of the top cover plate.

The solids feed inlet was made of a 1" diameter pipe, which intersected the cone section tangentially. The central axis of the pipe was in a plane perpendicular to the central axis of the cyclone and intersected the cone at a point about 7" below the junction of the base of the cone and the bottom of the cylindrical section. The auxiliary air supply means was a 6" diameter pipe which intersected the cylindrical section tangentially. The axis of the pipe intersected the cylindrical section at a point about 4½" below the top of the cyclone. The central axis of the auxiliary air supply pipe was positioned in a plane perpendicular to the central axis of the cyclone. The auxiliary air supply means was also positioned so that the flow of air in the cylindrical section would be concurrent to the flow of air and solids introduced through the solids feed inlet.

A scoop-like conduit of the type shown in Figures 3, 4, and 5 was introduced into the cyclone, one end being in the interior of the cyclone in the space adjacent to the periphery of the cylindrical section. The other end of the scoop-like conduit was at the exterior of the cyclone. The scoop intersected the body of the cyclone in the upper portion of the cone section, where it was secured by welding. The end of the scoop in the interior of the cyclone was in the shape of a rectangle, having the two longest sides parallel to the axis of the cyclone and the two shortest sides parallel to the top cover plate of the cyclone. The opening of the scoop was about 1⅝" high and about ⅝" wide. The side of the opening of the scoop nearest to the wall of the cylindrical section was positioned about 1" from the wall, and the bottom side of the opening was positioned about ½" above a plane through the junction of the base of the cone section and the cylindrical section. The sides of the scoop extending from the opening were tapered to form a pipe having a diameter of about 1". This pipe intersected the upper portion of the cone section and extended to the exterior of the cyclone in a direction sloping away from the top cover plate of the cyclone. The scoop is positioned so that in a plan view of the cyclone the point of intersection of the axis of the scoop with the wall of the cylindrical section is located a distance of about 15/16 of the circumference from the point where the axis of the auxiliary air supply line intersects the cylindrical section.

Solids were fed to the cyclone at the rate of about 16 pounds per hour. Compressed air was fed to the cyclone through the auxiliary air inlet at the rate of about 2400 feet per minute (471 c.f.m.).

The concentrate containing the major portion of the mica values was collected from the solids outlet at the apex of the cone. The solids containing the quartz, feldspar and organic material were removed from the cyclone through the scoop. The fine particles which passed out the top of the cyclone with the exit gases were discarded. Analysis of the apex and scoop products are as follows:

*Assay, percent by weight*

|  | Weight | Micas | Quartz and Feldspar | Organic |
|---|---|---|---|---|
| Apex Product | 94.9 | 95.5 | 1.5 | 2.8 |
| Scoop Product | 5.1 | 76 | 7.5 | 16.4 |

EXAMPLE II

A sample of silt base mica was screened as in Example I to obtain a —4+35 mesh fraction having the following analysis:

| Constituent: | Percent by weight |
|---|---|
| Mica [1] | 82 |
| Quartz and feldspar | 10 |
| Organic | 7.2 |

[1] This mica was predominantly muscovite with some biotite present.

After drying, the solids were suspended in air and fed under pressure into a cyclone separator. The cyclone separator used in this example had the same dimensions as the one that was used in Example I except that a different type of scoop was used.

The scoop used in this example was the type shown in Figures 6, 7, and 8. The end of the scoop in the interior of the cyclone formed a rectangle having a height of about 10" and a width of about ⅝". The curvature of the two vertical sides of the scoop had a radius of about 15". The sides were substantially equidistant from each other, being about ⅝" apart. The sides of the scoop tapered to the exterior of the cyclone where they formed a rectangle at the outlet end of the scoop which was about ⅝" x ⅝". The lateral position of the scoop was adjustable by means of three set screws which passed through the wall of the cylindrical section and were secured to the side of the scoop adjacent to the cylindrical section. The scoop was positioned so that the side of the scoop adjacent to the wall of the cylindrical section was spaced about ¼" from the wall at the top and about ⅜" at the bottom.

Solids were fed to the cyclone through the feed inlet at the rate of about 250 pounds per minute. Compressed air was fed to the cyclone through the auxiliary air inlet at the rate of about 2160 feet per minute (425 c.f.m.).

The concentrate containing the major portion of the mica values was collected from the solids outlet at the apex of the cone. The solids containing the quartz, feldspar and organic material were removed from the cyclone through the scoop. The fine particles which passed out the top of the cyclone with the exit gases were discarded. Analysis of the apex and scoop products are as follows:

*Assay, percent by weight*

|  | Weight | Micas | Quartz and Feldspar | Organic |
|---|---|---|---|---|
| Apex Product | 80 | 89 | 5 | 5.7 |
| Scoop Product | 20 | 56 | 30 | 13.4 |

EXAMPLE III

A sample of silt base mica was screened as in Example I to obtain a —4+40 mesh fraction having the following analysis:

| Constituent: | Percent by weight |
|---|---|
| Micas [1] | 94 |
| Quartz and feldspar | 2.4 |
| Organic | 3.5 |

[1] This mica is predominantly muscovite with some biotite present.

After drying, the solids were suspended in air and fed under pressure into the cyclone separator described in Example I.

The solids were fed through the feed inlet at the rate of about 16 pounds per hour. Compressed air was fed through the auxiliary air inlet at the rate of about 3600 feet per minute (708 c.f.m.). Analysis of the apex and scoop products are as follows:

Assay, percent by weight

|  | Weight | Micas | Quartz and Feldspar | Organic |
|---|---|---|---|---|
| Apex Product | 84.2 | 96.5 | 1.5 | 1.9 |
| Scoop Product | 15.8 | 80 | 7.5 | 12.1 |

EXAMPLE IV

The procedure in Example I was repeated with the exception that the outlet end of the scoop was attached to a sealed container preventing air flow through the scoop. Analysis of the apex and scoop products are as follows:

Assay, percent by weight

|  | Weight | Micas | Quartz and Feldspar | Organic |
|---|---|---|---|---|
| Apex Product | 92.1 | 96 | 1.5 | 2.6 |
| Scoop Product | 7.9 | 80.5 | 7.5 | 12.1 |

EXAMPLE V

The procedure of Example I was repeated with the exceptions that the —4+35 mesh fraction of silt base mica analyzed about 82% mica, about 10% quartz plus feldspar and about 7.2% organic, and that a vacuum equivalent to about 4" of mercury was applied to the scoop-like solids outlet. Analysis of the apex and scoop products are as follows:

Assay, percent by weight

|  | Weight | Micas | Quartz and Feldspar | Organic |
|---|---|---|---|---|
| Apex Product | 88.3 | 83 | 10 | 7.0 |
| Scoop Product | 11.7 | 48.4 | 32 | 19.6 |

Having now thus fully described and illustrated the invention, what is desired to be secured by Letters Patent is:

1. Apparatus for separating solids which are affected by centrifugal and frictional forces to a different degree when traveling in a circular path in a gaseous medium in a continuous process, which comprises a cyclone separator having a cylindrical section attached to the base of an inverted cone, means for feeding solids suspended in a gaseous medium tangentially into said cone, means for feeding auxiliary gas tangentially into the cylindrical section in a direction concurrent with the direction of flow of solids entering said means for feeding solids, said means for feeding auxiliary gas being positioned intermediate the top of said cyclone separator and said means for feeding solids, means for discharging solids most affected by centrifugal and frictional forces at the apex of said cone, a scoop-like conduit means in the cylindrical section to separate a suspension of solids intermediately affected by centrifugal and frictional forces to convey them to the exterior of the cylindrical section, a cover plate means enclosing the top of the cylindrical section, a vortex finder in the shape of a cone frustum depending from the cover plate and extending through the cylindrical section to a plane through the base of the cone, and a discharge means in the center of the cover plate to remove the gaseous medium and solids least affected by centrifugal and frictional forces.

2. The apparatus described in claim 1 where the lateral position of the scoop-like conduit means may be adjusted by means of set screws.

3. The apparatus described in claim 1 where the scoop-like conduit means is positioned near but removed from the periphery of the cylindrical section.

4. The apparatus described in claim 2 where the scoop-like conduit means is positioned near but removed from the periphery of the cylindrical section.

5. The apparatus described in claim 1 where the feed end of the scoop-like conduit means on the interior of the cyclone separator extends from the cylindrical section into the upper portion of the cone section.

6. Apparatus for separating solids which are affected by centrifugal forces to a different degree when traveling in a circular path in a gaseous medium in a continuous process, which comprises a cyclone separator having a cylindrical section attached to the base of an inverted cone, means for feeding solids suspended in a gaseous medium tangentially into said cone, means for feeding auxiliary gas tangentially into the cylindrical section in a direction concurrent with the direction of flow of solids entering said means for feeding solids, said means for feeding auxiliary gas being positioned intermediate the top of said cyclone separator and said means for feeding solids, means for discharging solids most affected by centrifugal and frictional forces at the apex of said cone, a scoop-like conduit means in the cylindrical section to separate a suspension of solids intermediately affected by centrifugal and frictional forces to convey them to the exterior of the cylindrical section, a cover plate means enclosing the top of the cylindrical section, and having a discharge means in the center of the cover plate to remove the gaseous medium and solids least affected by centrifugal and frictional forces.

7. The apparatus described in claim 6 where the lateral position of the scoop-like conduit means may be adjusted by means of set screws.

8. The apparatus described in claim 6 where the scoop-like conduit means is positioned near but removed from the periphery of the cylindrical section.

9. The apparatus described in claim 7 where the scoop-like conduit means is positioned near but removed from the periphery of the cylindrical section.

10. The apparatus described in claim 6 where the feed end of the scoop-like conduit means on the interior of the cyclone separator extends from the cylindrical section into the upper portion of the cone section.

References Cited in the file of this patent

UNITED STATES PATENTS

| 836,922 | Christoph | Nov. 27, 1906 |
| 854,516 | Miller | May 21, 1907 |
| 1,125,032 | Goodell | Jan. 12, 1915 |
| 1,159,267 | Posner | Nov. 2, 1915 |
| 2,153,026 | Ringius | Apr. 4, 1939 |
| 2,252,581 | Saint-Jacques | Aug. 12, 1941 |
| 2,756,878 | Herkenhoff | July 31, 1956 |
| 2,829,771 | Dahlstrom | Apr. 8, 1958 |

FOREIGN PATENTS

| 40,454 | France | Mar. 29, 1932 |
| | (1st Add. to Number 681,652) | |
| 20,481 | Finland | Aug. 27, 1945 |